Oct. 15, 1929.  A. J. CROWLEY  1,731,563
METHOD AND APPARATUS FOR EXTRACTING SULPHUR
Filed July 6, 1927
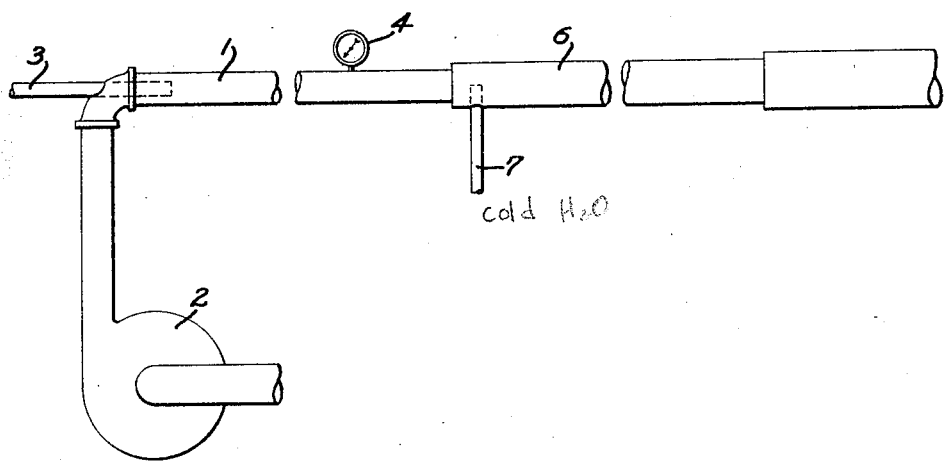
INVENTOR
ARTHUR J. CROWLEY
BY Charles S. Evans
HIS ATTORNEY.

Patented Oct. 15, 1929

1,731,563

UNITED STATES PATENT OFFICE

ARTHUR J. CROWLEY, OF SULPHUR, NEVADA, ASSIGNOR TO HUMBOLDT SULPHUR COMPANY, OF SULPHUR, NEVADA, A CORPORATION OF DELAWARE

METHOD AND APPARATUS FOR EXTRACTING SULPHUR

Application filed July 6, 1927. Serial No. 203,796.

My invention relates to a method and apparatus for extracting sulphur from a sulphur containing material, such as sulphur ore, in which the sulphur is mechanically enclosed, and the broad object of my invention is to extract the sulphur from the sulphur containing material by means of a liquid heated to a high temperature.

Another object of the invention is to extract the sulphur by a continuous process.

Another object of the invention is to coalesce the molten sulphur.

Another object of the invention is to extract the sulphur by means of superheated water under pressure and then permit the pressure to progressively decrease in order to cool the sulphur.

Another object of the invention is to cause the molten sulphur to flow through cold water so as to solidify it.

Other objects of the invention, together with the foregoing, will be set forth in the following description of my preferred embodiment of means for practicing my invention and which is illustrated in the drawings accompanying and forming part of the specification. It is to be understood that I do not limit myself to the showing made by the said description and drawings, as I may adopt variations of my preferred form within the scope of my invention as set forth in the claims.

Referring to the drawings:

The figure is a diagrammatic elevational view of the apparatus for carrying out my invention.

In a mixture of sulphur ore residue, superheated water and molten sulphur, the water will wet the ore residue, while the molten sulphur will not be attracted thereto but will collect in globules and due to the strong intermolecular attraction between the globules, they will collect in a mass. This physical property is taken advantage of in my process.

In terms of broad inclusion, my sulphur extractor comprises a series of elongated tubular passages, the diameters of which preferably progressively increase. The first or smaller tube of the series is the one in which the sulphur extraction and coalescing take place due to the injection of steam which heats the water in a mixture of water and sulphur containing material, which is continuously forced into the passage, by means of a pump or any other method, such as by gravity. Since a gauge pressure of about 15 lbs. per square inch is allowed to develop within the tube, the water is superheated to a temperature in excess of 235° F., which is sufficient to melt the sulphur from the sulphur containing material. Inasmuch as the water has a greater affinity for the sulphur ore residue, than the molten sulphur, it will wet the residue while the molten sulphur will not be attracted thereto, but will coalesce and collect in large masses due to the strong intermolecular attraction between globules of molten sulphur.

From the first tube, the entire mass is then passed into a larger tube thru which cold water flows, so as to fill the tube, and then thru as many increasingly larger tubes, thru which water circulates, as the conditions demand. The purpose of this is to gradiently decrease the velocity of flow thru the tubes and to successively decrease the pressure so that the coalesced masses of sulphur can cool and solidify. From the last passage or tube of the series, the sulphur is obtained in a solidified state.

In detail, my apparatus comprises a tubular passage 1, which is about 2 to 4 inches in diameter and 8 feet long and which may be caused to rotate or may be ribbed to provide for agitation of the material so as to facilitate the coalescing of the sulphur. Thru an open end of the tube a mixture of water and sulphur containing material is passed, by means of a pump 2, and steam is injected therein by means of steam pipe 3 while a pressure gauge 4 indicates the pressure. Tubular passage 1, is connected to and/or projects partly thru another tubular passage 6, of larger cross-section and a water inlet pipe 7, which preferably projects to a point within the tube 6 so as to cause the water to flow to a point within the materials passing from tube 1, permits the circulation of cold water thru the tube. Several of these tubular passages are connected one to another and each one of the tubes, except the first in which the extraction and coalescing occur, has means for circulating cold water therethrough. It is not necessary to have separate tubes, for the apparatus may be constructed as a unit having sections of progressively increasing diameter.

From the preceding, it can be seen that the molten sulphur extracted and coalesced in the first passage passes thru the series of passages, with a progressively decreasing velocity, so as to cause a cooling and consequent solidification thereof, and the solidified sulphur is taken out of the last passage in large masses.

The residue is also passed out of the last passage together with the large masses of sulphur, but since the sulphur has coalesced into masses which are larger than the particles of residue, the residue can be screened from the sulphur in any conventional manner.

I claim:

1. A continuous process of extracting sulphur which comprises passing sulphur containing material and water thru a passage; introducing steam for superheating the water to melt the sulphur from the material, coalescing the sulphur, and passing the coalesced sulphur and residue into a larger passage for cooling the coalesced sulphur to solidify it.

2. A continuous process of extracting sulphur which comprises passing sulphur containing material and water thru a passage; introducing steam for superheating the water to melt the sulphur from the material; coalescing the sulphur; and passing the coalesced sulphur and residue into a larger passage, filled with cold water, to solidify it.

3. A continuous process of extracting sulphur which comprises passing sulphur containing material and water thru a passage; introducing steam for superheating the water to melt the sulphur from the material; coalescing the sulphur; and passing the coalesced sulphur and residue thru a flow of cold water, for solidifying it.

4. An apparatus for extracting sulphur from sulphur containing material which comprises a series of tubes, the diameter of each succeeding tube being larger than the preceding tube; means for introducing sulphur containing material and water into the tube of least diameter; and means for superheating the water.

5. An apparatus for extracting sulphur from sulphur containing material which comprises a series of tubes, the diameter of each succeeding tube being larger than the preceding tube; means for introducing sulphur containing material and water into the tube of least diameter; and means for introducing steam into said tube.

6. An apparatus for extracting sulphur from sulphur containing material which comprises a series of tubes, the diameter of each succeeding tube being larger than the preceding tube; means for introducing sulphur containing material and water into the tube of least diameter; means for introducing steam into said tube; and means for introducing cold water into the other tubes.

7. An apparatus for extracting sulphur from sulphur containing material which comprises a series of tubes, means for introducing sulphur containing material and water into the first tube of said series, means for introducing steam into said tube; and means for introducing cold water into the remaining tubes of the series.

8. A process of extracting sulphur which comprises subjecting sulphur containing material in a passage to superheated water to melt the sulphur therefrom, coalescing the sulphur, and passing the coalesced sulphur and residue into a larger passage for cooling the coalesced sulphur to solidify it.

In testimony whereof, I have hereunto set my hand.

ARTHUR J. CROWLEY.